(12) United States Patent
Inaba et al.

(10) Patent No.: US 6,845,684 B2
(45) Date of Patent: Jan. 25, 2005

(54) TRANSMISSION SELECTOR ASSEMBLY FOR VEHICLE HAVING AUTOMATIC TRANSMISSION MOUNTED THEREON

(75) Inventors: Ei Inaba, Yokohama (JP); Takehiro Kuroda, Atsugi (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/434,108

(22) Filed: May 9, 2003

(65) Prior Publication Data

US 2003/0233897 A1 Dec. 25, 2003

(30) Foreign Application Priority Data

Jun. 19, 2002 (JP) ..................................... P 2002-178895

(51) Int. Cl.⁷ ............................................. F16H 27/00
(52) U.S. Cl. ...................... 74/335; 74/473.21; 74/473.3
(58) Field of Search ............................. 74/335, 473.12, 74/473.21, 473.3

(56) References Cited

U.S. PATENT DOCUMENTS

| | | | | |
|---|---|---|---|---|
| 4,815,341 A | * | 3/1989 | Ohkubo et al. ............. | 477/134 |
| 5,415,056 A | * | 5/1995 | Tabata et al. ................. | 74/335 |
| 6,076,414 A | * | 6/2000 | Tabata et al. ................. | 74/335 |
| 6,120,412 A | * | 9/2000 | Fujinuma ..................... | 477/99 |

FOREIGN PATENT DOCUMENTS

| | | | | |
|---|---|---|---|---|
| JP | 03-014731 | * | 1/1991 | .............. 74/473.24 |
| JP | 05-85215 | | 4/1993 | |

* cited by examiner

*Primary Examiner*—Ha Ho
(74) *Attorney, Agent, or Firm*—McDermott Will & Emery LLP

(57) ABSTRACT

A transmission selector assembly for a vehicle having an automatic transmission settable to gear ranges of low-speed ranges, a high-speed range and a higher-speed range. The transmission selector assembly includes: a selector lever which is shiftable between forward-gear positions of, at least, a high-speed position where the transmission is allowed to be set to the high-speed range or the higher-speed range, and a low-speed position where the transmission is allowed to be set to the low-speed range; and a gearshift switch for switching the gear ranges between the high-speed range and the higher-speed range while the selector lever remains in the high-speed position, and between gear ranges other than the high-speed range and the higher-speed range while the selector lever remains in the forward-gear positions other than the high-speed position.

16 Claims, 2 Drawing Sheets

FIG. 2

| (I) A/T DVC SELECTOR LEVER POSITION | (II) ATCU MEMORY | (III) TRANSMISSION | (IV) INDICATOR | |
|---|---|---|---|---|
| | | | GEAR RANGE | "O/D OFF" LAMP |
| P | STORE OD(4th) or 3rd | P | P | OFF ⇔ ON |
| ⇕ | STORE OD(4th) or 3rd | ⇕ | ⇕ | ⇕ |
| R | STORE OD(4th) or 3rd | R | R | OFF ⇔ ON |
| ⇕ | STORE OD(4th) or 3rd | ⇕ | ⇕ | ⇕ |
| N | STORE OD(4th) or 3rd | N | N | OFF ⇔ ON |
| ⇕ | STORE OD(4th) or 3rd | 1st to OD(4th) ⇔ 1st to 3rd | D ⇔ 3 | ⇕ |
| D | CANCEL | ⇕ ✕ | ⇕ ✕ | OFF ⇔ ON ✕ |
| ⇕ | | 1st to 2nd ⇔ 1st | 2 ⇔ 1 | ⇕ |
| L | STORE 2rd or 1st | | | OFF ⇔ ON |

TRANSMISSION SELECTOR ASSEMBLY FOR VEHICLE HAVING AUTOMATIC TRANSMISSION MOUNTED THEREON

BACKGROUND OF THE INVENTION

1. Field of the Invention

The present invention relates to a transmission selector assembly for a vehicle having an automatic transmission mounted thereon.

2. Description of Related Art

A transmission selector assembly for a modern automatic transmission vehicle is provided with a selector lever (shift lever) which is operated to be set, depending on needs, at any of positions; "P", "R", "N", "D", "2" and "1", whereby gear range of the transmission is shifted to Park, Reverse, Neutral, Drive or O/D (overdrive) range, Second-speed range and First-speed range, each corresponding to the respective positions of the selector lever.

The selector lever is provided with a gearshift switch operative to switch gear ranges between the Drive range as a high-speed range equivalent to Third-speed range and the O/D range as a higher-speed range equivalent to Fourth-speed range, while the selector lever is set at position "D" as a high-speed position.

SUMMARY OF THE INVENTION

In the above transmission selector assembly, the shift of gear ranges between Drive range and O/D range can be executed by operating the gearshift switch with the selector lever left in the position "D". However, in order to obtain the other gear ranges, that is, the second-speed range and the first-speed range, it is necessary to shift the selector lever to the other positions for forward gears, that is, the positions "2" and "1".

Specifically, in order to obtain the gear ranges other than the high-speed and higher-speed ranges when the selector lever is set at the positions for forward gears other than the position "D", it is necessary to shift the selector lever.

The shift stroke of the selector lever is therefore lengthened, resulting in a wasted space in the transmission selector assembly.

An object of the present invention is to provide a transmission selector assembly for a vehicle having a reduced number of selector lever positions for forward gears by utilizing a gearshift switch, thus accomplishing effective use of space.

An aspect of the present invention is a transmission selector assembly for a vehicle having a transmission settable to gear ranges of, at least, a low-speed range, a high-speed range and a higher-speed range, the transmission selector assembly comprising: a selector lever movable between a plurality of forward-gear positions including a high-speed position where the transmission is allowed to be set to the high-speed range or the higher-speed range, and a low-speed position where the transmission is allowed to be set to the low-speed range; and a gearshift switch for switching the gear ranges, between the high-speed range and the higher-speed range while the selector lever remains in the high-speed position, and between gear ranges other than the high-speed range and the higher-speed range while the selector lever remains in the forward-gear positions other than the high-speed position.

BRIEF DESCRIPTION OF THE DRAWINGS

The invention will now be described with reference to the accompanying drawings wherein:

FIG. 2 is a table showing relationships among operations of the selector lever and the gearshift switch of FIG. 1, and controls and displays thereof. Arrows (↑) and (⇋) in the table represent shifts or changes made by operations of the selector lever and the gearshift switch, respectively. A column (I) represents selector lever positions. Columns (II), (III) and (IV) respectively represent controls to an automatic transmission control unit (ATCU) memory, and changes in gear range and indicator display, in response to the operations of the selector lever or the gearshift switch.

DETAILED DESCRIPTION OF THE PREFERRED EMBODIMENT

Figure 1:
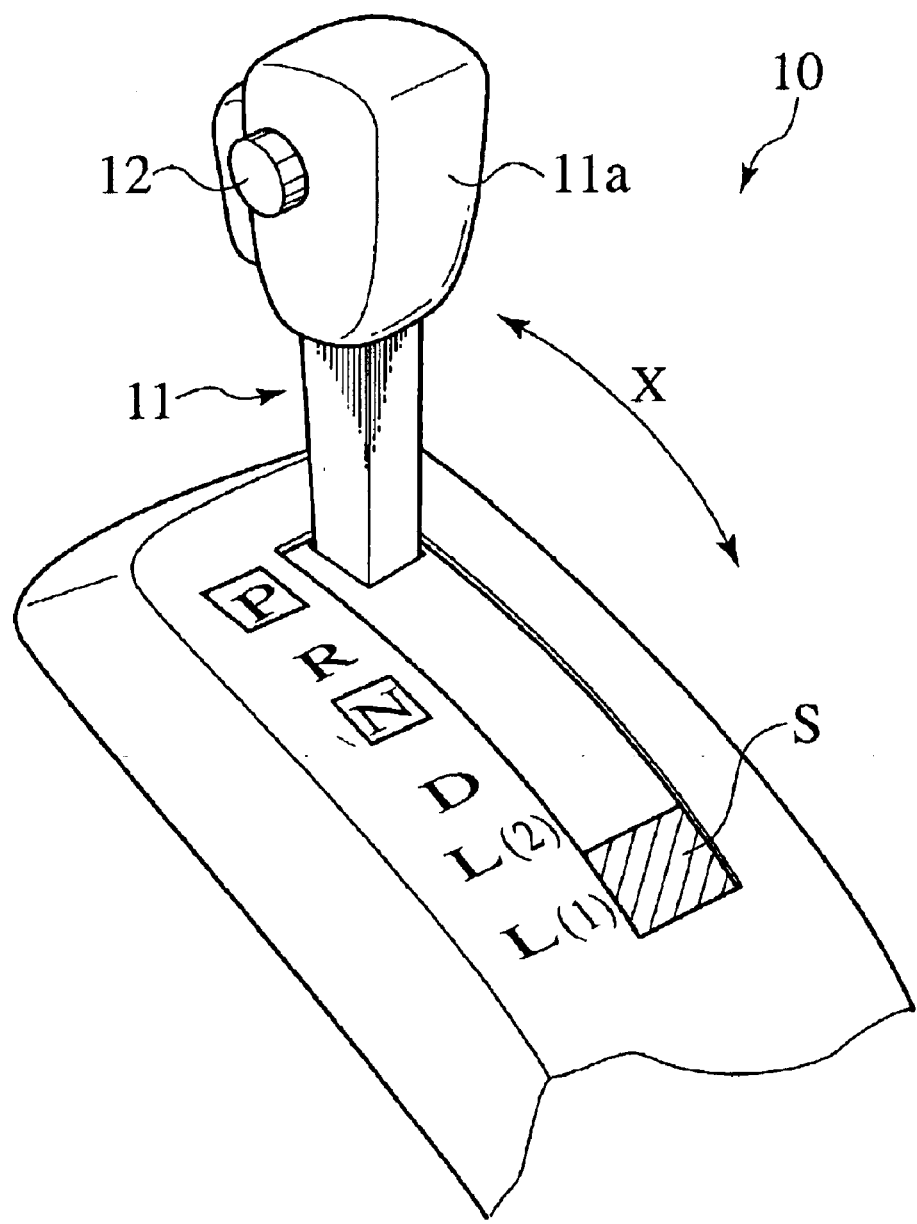
FIG. 1 is a perspective view of a selector lever of a transmission selector assembly for explaining a first embodiment of the present invention. Selector lever positions of "P (Park)", "R (Reverse)", "N (Neutral)", "D (Drive)" and "L (Low)" are illustrated, and a gearshift switch is provided on the selector lever. Positions "2" and "1" in parentheses are shown for explaining the related art.

Embodiments of the present invention will be explained below with reference to the drawings, wherein like members are designated by like reference characters.

A selector lever 11 of a transmission selector assembly 10 shown in FIG. 1 is shifted to any of its positions by holding a knob 11a provided on the tip end thereof and moving the selector lever 11 in the X direction in FIG. 1.

The transmission selector assembly 10 is located in various places suitable for operation by the driver, and are classified as a floor-mounted type in which the assembly 10 is provided on a floor beside a driver's seat, an instrument panel-mounted type in which the assembly 10 is provided on an instrument panel in front of the driver's seat, and a column-mounted type in which the assembly 10 is provided on a steering column.

The direction X will approximately be a vehicle longitudinal direction in the case of the floor-mounted type, a vertical direction in the case of the instrument panel-mounted type, and a direction perpendicular to the selector lever 11 extended substantially horizontally in a vehicle transverse direction in the case of the column-mounted type.

In the first embodiment, the transmission selector assembly 10 performs a gearshift operation of a four-speed automatic transmission, in which the selector lever 11 can be set at five positions, P, R, N, D and L.

The gearshift switch 12 provided on the knob 11a is configured to be operative when the selector lever 11 is set at the positions "D" and "L".

When the selector lever 11 is set at the position "D" as the high-speed position, the gear range can be shifted either to the third-speed range as the high-speed range or to the fourth-speed range that is the O/D (overdrive) range as the higher-speed range, by operating the gearshift switch 12.

Furthermore, in this embodiment, the gearshift switch 12 can be used even when the selector lever 11 is set at the position "L" as a low-speed position, and the gear range can be shifted to the second-speed range or the first-speed range as low-speed ranges by operating the gearshift switch 12.

The transmission is allowed to make automatic adjustments from first-speed gear to fourth-speed gear while the gear range is set to the fourth-speed range, from the first-speed gear to third-speed gear while the gear range is set to the third-speed range, and between the first-speed gear and second-speed gear while the gear range is set to the second-speed range. When the gear range is set to the first-speed range, the transmission is fixed to the first-speed gear.

The gearshift switch 12 is a momentary-on/normally-off switch that outputs an operation signal (ON signal) only while being pushed by applying operational force thereon, and is reset when the operational force is released to stop the operation signal (OFF signal).

Description will now be made with the selector lever 11 being moved in an order of the positions "P", "R", "N", "D" and "L", which is from top to bottom of the column (I) in FIG. 2.

When the selector lever 11 is in the positions "P", "R" and "N", the gear range is set to Park, Reverse and Neutral, each corresponding to the respective positions, as shown in the column (III) in FIG. 2.

When the selector lever 11 is shifted to the position "D", the gear range is put into the fourth-speed range (O/D range) where the transmission is allowed to make an automatic adjustment from the first-speed gear to the fourth-speed gear. In this case, if operational force is applied to the gearshift switch 12, that is, when the gearshift switch 12 is pushed once to output the ON signal, the gear range is shifted from the fourth-speed range to the third-speed range. After the operational force applied to the gearshift switch 12 is released to stop the operation signal, the third-speed range is maintained until the gearshift switch 12 is pushed again to output another ON signal.

When the selector lever 11 is further shifted to the position "L", the gear range is put into the second-speed range where the transmission is allowed to make an automatic adjustment between the first-speed gear and the second-speed gear. In this case, if the operational force is applied to the gearshift switch 12, that is, when the gearshift switch 12 is pushed once to output the ON signal, the gear range is shifted from the second-speed range to the first-speed range. After the operational force applied to the gearshift switch 12 is released to stop the operation signal, the first-speed range is maintained until the gearshift switch 12 is pushed again to output another ON signal.

On an indicator in front of the driver, a display lamp is provided, which serves as a displaying means which turns on to display characters of "O/D off" when the forth-speed range (O/D range) is inactivated, but is otherwise turned off.

As shown in the column (IV) in FIG. 2, if the gearshift switch 12 is pushed once to output the ON signal when the selector lever 11 is set in the position "D", similarly when the selector lever 11 is set in the positions "P", "R" and "N", the display lamp is turned on by this ON signal. After the operational force applied to the gearshift switch 12 is released to stop the operation signal, the display lamp continues to be turned on until the gearshift switch 12 is pushed again to output the ON signal. The display lamp remains turned on or off, even when the selector lever 11 is shifted between the positions "P" and "R", "R" and "N", and "N" and "D".

When the selector lever 11 is set in the position "L", the display lamp remains turned off irrespective of the operation of the gearshift switch 12. Specifically, even if the gearshift switch 12 is pushed to output the ON signal, the display lamp continues to be turned off. When the selector lever 11 is shifted from the position "D" to the position "L", the display lamp is turned off even if it has been turned on until that time. When the selector lever 11 is shifted from the position "L" to the position "D", the display lamp continues to be turned off.

As shown in the column (II) of FIG. 2, the automatic transmission control unit (ATCU) stores in its memory, the gear ranges shifted by the operation of the gearshift switch 12 while the selector lever 11 is set at the positions "P", "R", "N" and "D". When the selector lever 11 is shifted from the position "N" to the position "D", the transmission is put into the gear range stored in the memory. Specifically, the gear range, which was stored in the memory when the selector lever 11 is set at the position "D" (the O/D range or the Drive range), is retained in the memory, unless the gearshift switch 12 is operated from when the selector lever 11 is moved out of the position "D" until the selector lever 11 is again shifted thereto. In this case, when the selector lever 11 is shifted back to the position "D" again, the transmission is put into the same gear range as the one it was in when the selector lever 11 was previously at the position "D".

Moreover, also when the selector lever 11 is set at the position "L", the ATCU stores in the memory, the gear ranges shifted by the operation of the gearshift switch 12 as long as the selector lever 11 stays at the position "L".

When the selector lever 11 is shifted from the position "D" to the position "L", the gear range, which was stored in the memory when the selector lever 11 was previously set at the position "L", is canceled from the memory. Then, the gear range is set to the highest-speed gear range in gear ranges executable at the position "L", that is, the second-speed range. This second-speed range is maintained until the ON signal is outputted from the gearshift switch 12.

As described above, the gear range stored in the memory while the selector lever 11 is set at the positions "P", "R", "N" and "D", and the gear range stored in the memory while the selector lever 11 is set at the position "L", are canceled from the memory when the selector lever 11 is shifted between the positions for forward gears, "D" and "L". Then, the transmission is automatically set at the highest-speed gear range among gear ranges executable at a position of the selector lever 11 after the gear range is shifted.

The gear ranges shifted by the operation of the gearshift switch 12 and stored in the memory are further canceled from the memory by turning off an ignition switch (not shown). Then, the transmission is automatically set at the highest-speed gear range among gear ranges executable at each position of the selector lever 11, that is, the O/D range in the position "D" or the second-speed range in the position "L" in this embodiment.

Specifically, in the transmission selector assembly 10 of this embodiment, when the selector lever 11 is shifted to the position "D", the transmission is put into the O/D range until the ON signal is outputted from the gearshift switch 12, thus enabling a gearshift to the fourth-speed gear suitable for high-speed cruising. When the selector lever 11 is set at the position "D" and the gearshift switch 12 is pushed to output the ON signal, "O/D off" is displayed by the display lamp on the indicator, and the transmission is put into the Drive range, thus obtaining the third-speed gear, which is excellent in acceleration performance.

When the selector lever 11 is shifted to the position "L", the transmission is put into the Second-speed range, thus enabling a gearshift up to the second-speed gear. When the selector lever 11 is set at the position "L" and the gearshift switch 12 is pushed to output the ON signal, the transmission can be fixed to the first-speed gear.

Specifically, each time the ON signal is outputted from the gearshift switch 12, the gear range of the transmission can be switched between the Drive range and the O/D range when the selector lever 11 is set at the position "D". Similarly, the gear range can be switched between the Second-speed and First-speed ranges when the selector lever 11 is set at the position "L". Hence, the number of positions of the selector lever for forward gears can be reduced.

Specifically, in a general transmission selector assembly of the related art, the transmission cannot be put into the second-speed and first-speed ranges at one position "L", but is put into the respective ranges at the separate positions L(2) and L(1) as illustrated in the parentheses of FIG. 1. Hence, the selector lever requires six positions in total, i.e., "P", "R", "N", "D", "L(2)" and "L(1)", and the hatched space S of the assembly in FIG. 1 is wasted.

On the contrary, in the transmission selector assembly 10 of this embodiment, the effective utilization of the gearshift switch 12 brings five positions in total, i.e., "P", "R", "N", "D" and "L", for the positions of the selector lever as shown in Table 1. Specifically, the hatched space S in FIG. 1 is no longer required, and the shift stroke of the selector lever 11 can be shortened by one position, thus enabling effective utilization of the space of the transmission selector assembly 10.

TABLE 1

4-Speed Automatic Transmission

| Embodiment | | Related Art | |
|---|---|---|---|
| Lever Position | Gear Range | Lever Position | Gear Range |
| P | Park | P | Park |
| R | Reverse | R | Reverse |
| N | Neutral | N | Neutral |
| D | 4–3 | D | 4–3 |
| L | 2–1 | 2 | 2 |
| | | 1 | 1 |

Incidentally, in this embodiment, the gear ranges shifted by the operation of the gearshift switch 12 are canceled from the memory of the ATCU when the selector lever 11 is shifted between the positions "D" and "L". Immediately after the selector lever 11 is shifted to the position "D" or "L", the transmission is set to the gear ranges where the transmission is allowed to make an automatic adjustment from the first-speed gear to the fourth-speed gear in the position "D", and between the first-speed gear and the second-speed gear in the position "L". This eliminates the necessity of operating the gearshift switch 12 each time the selector lever 11 is shifted, thus enabling a smooth gearshift.

Moreover, the gear ranges shifted by the operation of the gearshift switch 12 and stored in the memory are cancelled by turning off the ignition switch, and when the ignition switch is next turned on, reestablished at the higher-speed gear ranges, the O/D range at the position "D" and the second-speed range at the position "L". Thus, smooth running will be made possible without operating the gearshift switch 12.

Furthermore, the gearshift switch 12 is a momentary-on/normally-off switch that outputs the ON signal only while being pushed by applying an operational force, and which stops the operation signal (or outputs an OFF signal) when the operational force is released. The gearshift switch 12 does not continuously output the ON signal during the shift of the selector lever 11, and this contributes to the simple configuration of the ATCU circuit.

Furthermore, as shown in the column (IV) in FIG. 2, if the gearshift switch 12 is operated to output the ON signal when the selector lever 11 is set at the position "D", the display lamp is turned on to display the characters of "O/D off". When the selector lever 11 is set at the position "L", which is the position for forward gears other than the position "D", the display lamp is turned off irrespective of the operation of the turning on/off of the gearshift switch 12. Therefore, drivers can be prevented from misidentifying the Drive range of the position "D" with the First range of the position "L".

Specifically, the transmission selector assembly 10 of the first embodiment is for a vehicle having an automatic transmission settable to gear ranges of low-speed ranges (the first-speed and second-speed ranges), a high-speed range (Drive range) and a higher-speed range (O/D range). The transmission selector assembly 10 includes the selector lever 11 movable between a plurality of forward-gear positions including the high-speed position "D" where the transmission is allowed to be set to the high-speed range or the higher-speed range, and a low-speed position "L" where the transmission is allowed to be set to the low-speed range; and the gearshift switch 12 for switching the gear ranges, between the high-speed range and the higher-speed range while the selector lever 11 remains in the high-speed position "D", and between gear ranges other than the high-speed range and the higher-speed range while the selector lever 11 remains in the forward-gear positions other than the high-speed position "D".

According to the above structure, the total number of selector lever positions for forward gears can be reduced, and the shift stroke of the selector lever can be shortened. The space of the transmission selector assembly is thus effectively utilized.

Although the first embodiment of the present invention was described above as the transmission selector assembly for a four-speed automatic transmission, in which the selector lever positions are reduced to five positions in total, that is, "P", "R", "N", "D" and "L", in comparison with a general transmission selector assembly having six positions in total as the selector lever positions, that is, "P", "R", "N", "D", "2" and "1", the present invention is not limited to the embodiment, and can be applied to the case where the number of selector lever positions is six or more. For example, the present invention can be applied to a five-speed automatic transmission having seven positions in total, that is, "P", "R", "N", "D", "3", "2" and "1", or to a six-speed automatic transmission having eight positions in total, "P", "R", "N", "D", "4", "3", "2" and "1".

In the transmission selector assembly for a five-speed automatic transmission having seven positions in total, i.e., "P", "R", "N", "D", "3", "2" and "1", the transmission is set in the O/D range in which the transmission is allowed to make an automatic adjustment from the first-speed gear to the fifth-speed gear when the selector lever is first shifted to the position "D". If the gearshift switch 12 is operated while the selector lever is at the position "D", the ON signal is outputted and the transmission is set to the Drive range where the automatic adjustment of the transmission is performed from the first-speed gear to the fourth-speed gear. After the OFF signal is outputted from the gearshift switch 12, the Drive range is maintained until another ON signal is outputted.

In a second embodiment in which the present invention is applied to the above transmission selector assembly, utilizing the gearshift switch 12 also at the position "3" besides the position "D", both the third-speed range and second-speed range become executable at the position "3". Hence, as shown in Table 2, the selector lever positions are reduced from the total seven positions of "P", "R", "N", "D", "3", "2" and "1" to the total six positions of "P", "R", "N", "D", "3" and "L". Therefore, the shift stroke of the selector lever 11 can be shortened by an equivalent of one position, thus enabling effective utilization of the space similarly to the above-described first embodiment.

TABLE 2

5-Speed Automatic Transmission

| Embodiment | | Related Art | |
|---|---|---|---|
| Lever Position | Gear Range | Lever Position | Gear Range |
| P | Park | P | Park |
| R | Reverse | R | Reverse |
| N | Neutral | N | Neutral |
| D | 5–4 | D | 5–4 |
| 3 | 3–2 | 3 | 3 |
| L (or 1) | 1 | 2 | 2 |
| | | 1 | 1 |

Note that, when the selector lever 11 of the second embodiment is set at the position "L", the gear range is set to the First range, where the transmission is fixed to the first-speed gear.

In the transmission selector assembly for the six-speed automatic transmission having eight positions in total, i.e., "P", "R", "N", "D", "4", "3", "2" and "1", the transmission is set in the O/D range in which the transmission is allowed to make an automatic adjustment from the first-speed gear to the sixth-speed gear when the selector lever is first shifted to the position "D". If the gearshift switch 12 is operated while the selector lever is at the position "D", the ON signal is outputted and the transmission is set to the Drive range where the automatic adjustment of the transmission is performed from the first-speed gear to the fifth-speed gear. After the OFF signal is outputted from the gearshift switch 12, the Drive range is maintained until another ON signal is outputted.

In a third embodiment in which the present invention is applied to the above transmission selector assembly, utilizing the gearshift switch 12 also at the positions "4" and "L" (or "2") besides the position "D", both the fourth-speed range and third-speed range become executable at the position "4", and both the second-speed range and first-speed range become executable at the position "L". Hence, as shown in Table 3, the selector lever positions are reduced from the total eight positions of "P", "R", "N", "D", "4", "3", "2" and "1" to the total six positions of "P", "R", "N", "D", "4" and "L". Therefore, the shift stroke of the selector lever 11 can be shortened by an equivalent of two positions, thus enabling effective utilization of the space similarly to the above-described first embodiment.

TABLE 3

6-Speed Automatic Transmission

| Embodiment | | Related Art | |
|---|---|---|---|
| Lever Position | Gear Range | Lever Position | Gear Range |
| P | Park | P | Park |
| R | Reverse | R | Reverse |
| N | Neutral | N | Neutral |
| D | 6–5 | D | 6–5 |
| 4 | 4–3 | 4 | 4 |
| L (or 2) | 2–1 | 3 | 3 |
| | | 2 | 2 |
| | | 1 | 1 |

Incidentally, even in the second and third embodiments shown in Tables 2 and 3, it is desirable that the gear ranges stored in the memory of the ATCU be canceled by the shift between the selector lever positions for forward gears similarly to the first embodiment. It is also desirable that the gear ranges be set to the higher-speed ones by turning off the ignition switch.

Moreover, it is desirable that the gearshift switch 12 be a momentary-on/normally-off switch similar to the first embodiment. It is desirable that the display lamp be turned on/off by the operation of the gearshift switch 12 when the selector lever 11 is set at the position "D" and be turned off when the selector lever 11 is set at positions other than "D".

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matter contained in Japanese Patent Application No. 2002-178895, filed on Jun. 19, 2002, the disclosure of which is expressly incorporated herein by reference in its entirety.

What is claimed is:

1. A transmission selector assembly for a vehicle having a transmission settable to gear ranges of, at least, a low-speed range, a high-speed range and a higher-speed range, the transmission selector assembly comprising:

a selector lever movable between a plurality of forward-gear positions including a high-speed position where the transmission is allowed to be set to the high-speed range or the higher-speed range, and a low-speed position where the transmission is allowed to be set to the low-speed range; and a gearshift switch for switching the gear ranges, between the high-speed range and the higher-speed range while the selector lever remains in the high-speed position, and between gear ranges other than the high-speed range and the higher-speed range while the selector lever remains in the forward-gear positions other than the high-speed position.

2. The transmission selector assembly according to claim 1, further comprising:

a control unit with a memory for storing the gear ranges therein, wherein the gear ranges stored in the memory are canceled by shifting the selector lever between the forward-gear positions.

3. The transmission selector assembly according to claim 2, wherein the transmission is set, after the cancellation, to a highest-speed gear range among the gear ranges executable at a position of the selector lever after being shifted.

4. The transmission selector assembly according to claim 1, further comprising:

a control unit with a memory for storing the gear ranges therein, wherein the gear ranges stored in the memory are canceled by turning off an ignition switch.

5. The transmission selector assembly according to claim 4, wherein the transmission is set, after the cancellation, to a highest-speed gear range among the gear ranges executable at each position of the selector lever.

6. The transmission selector assembly according to claim 1, wherein the transmission switch comprises a momentary-on/normally-off switch which outputs an operation signal only while being applied with operational force, and stops the operation signal when the operational force is released.

7. The transmission selector assembly according to claim 1, further comprising:

a display lamp to be turned on and off by an operation of the gearshift switch, wherein the display lamp is turned off when the selector lever is shifted to the forward-gear positions other than the high-speed position.

8. The transmission selector assembly according to claim 7, wherein the display lamp continues to be turned off as long as the selector lever remains in the forward-gear positions other than the high-speed position.

9. A shifting method of a transmission for a vehicle, the transmission being settable to gear ranges of, at least, a high-speed range and a higher-speed range, the method comprising:

providing a selector lever movable between a plurality of forward-gear positions including a high-speed position where the transmission is allowed to be set to the high-speed range or the higher-speed range;

providing a gearshift switch for switching the gear ranges on the selector lever;

switching gear ranges by the gearshift switch, between the high-speed range and the higher-speed range while the selector lever remains in the high-speed position; and switching gear ranges by the gearshift switch, between gear ranges other than the high-speed range and the higher-speed range while the selector lever remains in the forward-gear positions other than the high-speed position.

10. The shifting method according to claim 9, further comprising:

providing a control unit with a memory for storing therein the gear ranges shifted by the gearshift switch; and canceling the gear ranges stored in the memory by shifting the selector lever between the forward-gear positions.

11. The shifting method according to claim 10, further comprising:

after canceling the gear ranges, setting the transmission to a highest-speed gear range among the gear ranges executable at a position of the selector lever after being shifted.

12. The shifting method according to claim 9, further comprising:

providing a control unit with a memory for storing therein the gear ranges shifted by the gearshift switch; and canceling the gear ranges stored in the memory by turning off an ignition switch.

13. The shifting method according to claim 12, further comprising:

after canceling the gear ranges, setting the transmission to a highest-speed gear range among the gear ranges executable at each position of the selector lever.

14. The shifting method according to claim 9, wherein the gearshift switch comprises a momentary-on/normally-off switch which outputs an operation signal only while being applied with operational force, and stops the operation signal when the operational force is released.

15. The shifting method according to claim 9, further comprising:

providing a display lamp to be turned on and off by an operation of the gearshift switch, and turning off the display lamp when the selector lever is shifted to the forward-gear positions other than the high-speed position.

16. The shifting method according to claim 15, further comprising:

continuing to turn off the display lamp as long as the selector lever remains in the forward-gear positions other than the high-speed position.

* * * * *